Aug. 7, 1951     L. P. KELLY     2,563,045
DRYING REEL FOR FISHING LINES
Filed Oct. 6, 1947     2 Sheets-Sheet 1
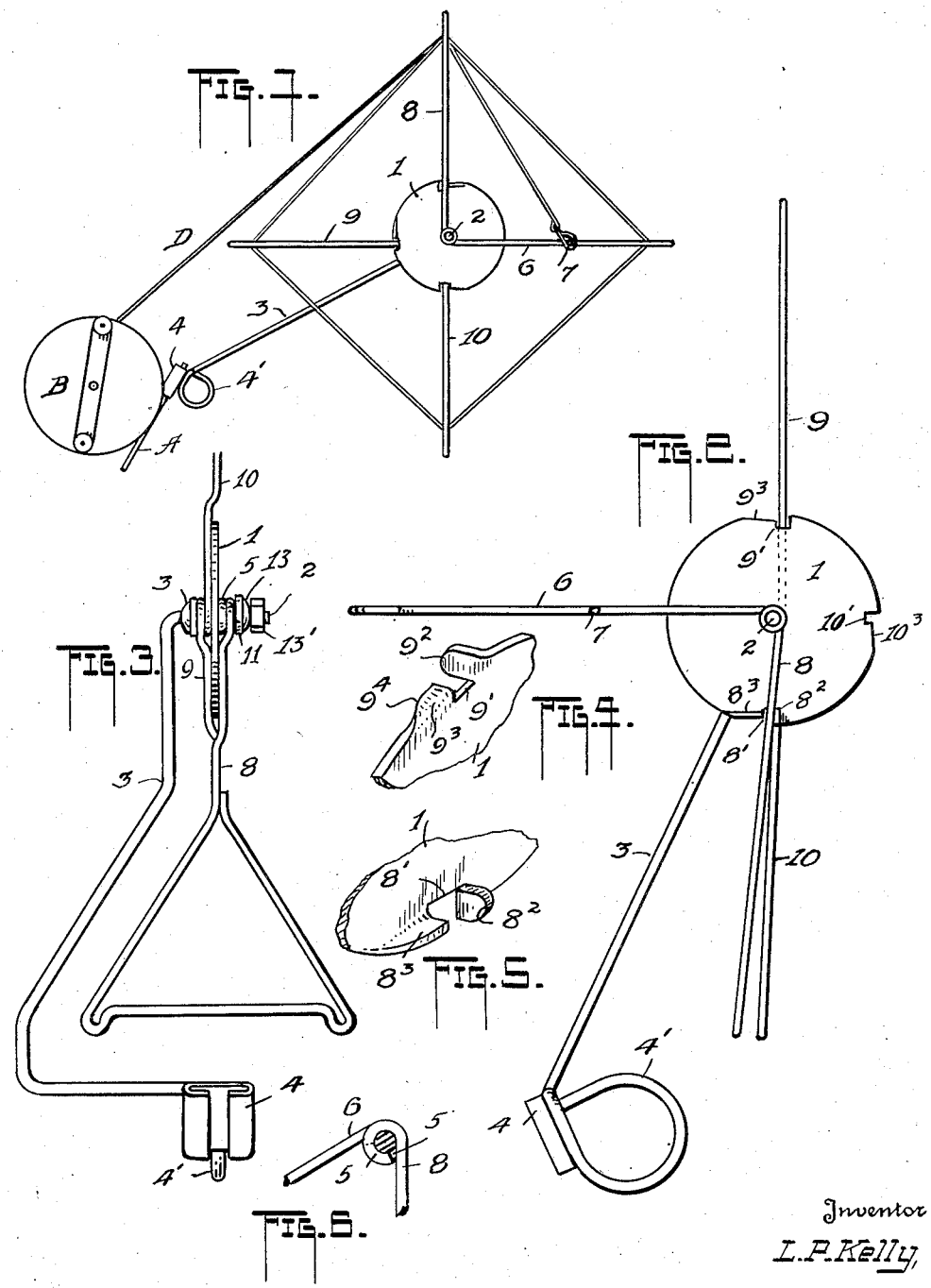
Inventor
L. P. Kelly

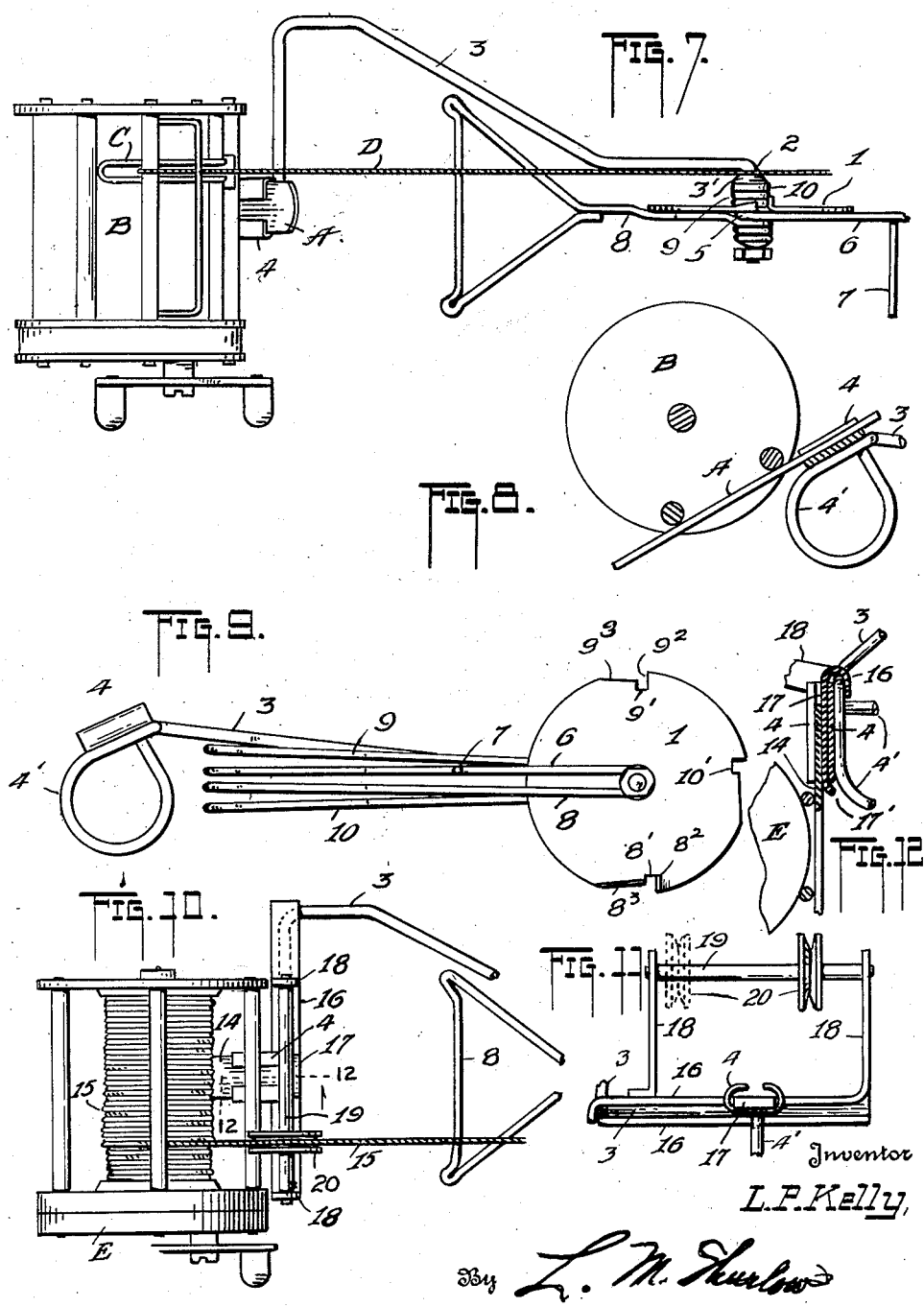

Patented Aug. 7, 1951

2,563,045

UNITED STATES PATENT OFFICE 2,563,045

DRYING REEL FOR FISHING LINES

Lewis P. Kelly, Peoria Heights, Ill.

Application October 6, 1947, Serial No. 778,164

1 Claim. (Cl. 242—104)

This invention pertains to fishing line reels. More particularly, the invention relates to reels whereon a wet fishing line may be wound for drying.

An object is to combine a line drying reel with a casting reel having means for shuttling the line in spaced windings upon said drying reel so that the wound strands may be readily and thoroughly cleaned, and then fully dried ready for return of the line to said casting reel.

Again, an object is to furnish a line drying reel the arms of which can be spread apart for line drying purposes and each halted on a carrier therefor at proper spaced fixed positions automatically, and that can be fully collapsed to occupy but a very small space for storage in the fisherman's tackle-box.

The invention may be understood from the following specification aided by the accompanying drawings forming part hereof.

Figure 1 is a side elevation of the drying reel of my invention shown in connection with a casting reel.

Figure 2 is a side elevation of the drying reel full size.

Figure 3 is a front elevation of the reel taken as it would be seen in viewing said Figure 2 from the left.

Figures 4 and 5 show parts of the reel in perspective, much enlarged.

Figure 6 is an elevation of a shaft portion of the reel showing the disposal of certain members thereat.

Figure 7 is a plan of part of the drying reel together with a casting reel showing the connected relation of the two.

Figure 8 is a side elevation of parts of the reel, and a casting reel, parts being shown in cross section.

Figure 9 is a side elevation of the reel in its collapsed form.

Figure 10 is a plan of a casting reel and certain parts illustrated in Figure 7.

Figure 11 is an elevation of a structure shown in Figure 10 as viewed from the left of that figure, and Figure 12 is a transverse section of parts of Figure 10 produced on line 12—12 of that figure.

In so far as is known a line drying reel has not been mounted directly upon a casting reel adapted for so called "level winding" of the line, whereby the advantages of the level winding mechanism have been utilized for spreading windings of a line upon said drying reel, and with the further advantage of rewinding from the latter upon said casting reel. The advantage of such relation of the two reels will become evident herein and constitutes one of the objects of the invention. In addition, the manner of constructing the drying reel is believed to be new since said reel may be collapsed in a compact form and in such form as to occupy but little space in a tackle-box, a desirable advantage.

In the figures 1 denotes a disc which is rotatably mounted upon an extension 2 at one end of a supporting arm 3. The other end of the arm is provided with a socket member 4 carrying a loop 4' to conveniently receive a finger of the operator. Said socket member is adapted to engage upon the usual cleat A of the casting reel B, as in Figures 1, 2 and 8, by which the said arm 3 and said casting reel are at once rigidly connected, the latter having any usual traveling guide C for control of the line D for level winding purposes.

In the present instance an eye 5 on one end of the reel arm 6 engages over the named extension 2 of the supporting arm 3, said reel arm abutting and being suitably affixed to one side of said disc 1, said arm 6 and the disc turning together upon said shaft portion, there being a lateral extension 7 on the said arm by which the parts may be rotated. Lying adjacent the disc at that side to which the reel arm 6 is secured is a second reel arm 8, one end encompassing the shaft and abutting said eye 5, in this instance, and free to turn about said shaft portion. At the opposite side of the disc are two other reel arms 9 and 10 at one of their ends encircling the shaft portion as illustrated in Figure 6, this figure also applying to the arms 6 and 8, such relation being likewise shown in Figure 3.

The arms abut each other at the shaft portion, the outer one of the two being received against an abutment 3' on the supporting arm 3 and lying between said abutment and the said disc 1. At the opposite side of the disc the eye 5 of the arm 6 abuts the said disc while the eye of the arm 8 abuts said eye 5, followed by a washer 11, a spring washer 12 and a nut 13' threaded on the shaft portion. This structure as described is merely but one manner of arranging the parts for use.

It is observed that while the several reel arms are of equal length their free extremities have a width of spread substantially equal to the length of the casting reel B opposite which they are to rotate whereby the line C drawn from said reel B may be spread in spaced winding. While the reel arm 6 is fixed to the disc 1, the other arms 8, 9, 10 are free to turn with respect to the latter, means being provided for fixing these free arms, however, with respect to the disc during winding operations. To this end the disc at its periphery is notched at three substantially equally spaced positions in respect to the fixed arm 6.

In Figs. 4 and 9 at the notch 9' an ear $9^2$ is bent at right angles to the plane of the disc and away from the observer in this instance. Also at said notch part of the disc edge at $9^3$ is turned in the same direction creating a cam surface $9^4$, the abrupt cam-edge and said ear facing each other to receive a reel arm to be held between them. At the notch 8' an ear 8² and cam 8³ are provided as in Figure 5, but in this case face in the direction of the observer. Finally, at the notch 10' the ear and cam at 10², 10³, respectively, face away from the observer.

In spreading the reel arms to their radial positions shown in Figure 1 from their collapsed positions in Figure 9, the supporting arm 3 may be held in the left hand, for example, with the thumb of that hand in control of the arms as collapsed. Now by lifting and swinging the arm 9 with the fingers of the right hand it may be locked behind the cam 9' the resilience of the arm there maintaining it. Following this the arm 6 is lifted to swing about the shaft portion 3' thus turning the disc with it whereupon the notch 8' is brought to a position where the arm 8, is still held by the left hand fingers, will drop into it. Now by releasing the arm 8 from the fingers and swinging it to rotate the disc the notch 10' will approach the arm 10 to receive the same, the reel now being in its line-receiving form. The positions of the arms at this time may be the positions from which they may be collapsed. That is to say, supposing the arm 10 were held by the thumb of the left hand, said arm is swung laterally to release it from the disc whereupon said arm may be swung down upon arm 10, and also swung laterally to release it from the disc, thus allowing the disc to turn when grasping and lowering the arm 6. Finally, by lateral movement of the arm 9 it is also released from the disc to complete the collapsing operation. Naturally, the supporting arm 3 during such manipulations of the reel arms could as well have been operated while mounted upon the casting reel.

It is, of course, necessary that the fisherman always dry a wet line. In having a drying reel that can be mounted upon his casting reel as a portable rigging he can at any time and anywhere mount the drying reel, and in one operation transfer the line of the latter with resulting spaced windings which may be readily relieved of all dirt and other adhering matter, and then allowed to dry.

It will be understood that since the peripheral rotation of the drying reel arm as turned by hand, is naturally greater than the rate of rotation of the casting reel windings the automatic spacing of the windings as drawn from the latter reel upon said drying reel is readily brought about.

The usual cleat A secured to the casting reel, as is observed, is the member always conveniently at hand for attachment of the drying reel to thus provide a complete dual, winding whole.

In Figures 10, 11 and 12 is shown an attachment for the drying reel for use with a casting reel that has no automatic feed for level winding purposes as distinguished from the casting reel of the earlier figures. When using this second type of reel the fisherman, as is known, usually guides the line upon the reel by means of his finger or thumb.

In Figure 10 the last named type of reel is indicated at E and has the cleat 14 corresponding to the cleat A of Figures 1 and 7, while 15 is the fishing line. A channel member 16, in this instance, embraces the supporting arm 3 of the drying reel and lies adjacent to and parallels said casting reel. Extending laterally from this member is a tongue 17 adapted to enter the socket member 4 and wedge therein together with the said cleat 14, as shown in Figure 12, whereby said channel member is firmly fixed with respect to both reels. The free end of the tongue 17 preferably terminates in a turned lip 17' to engage or lodge against the socket member to aid in the maintenance of a secure arrangement.

Affixed to and arising from the channel member as in Figure 11 is a pair of spaced arms 18 between whose extremities is a rod 19 upon which is freely rotatable a grooved wheel 20 which, however, is also free to shift along said rod.

This structure is provided as an attachment for the drying reel so that as in Figure 10 the line 15 may be wound by the named reel from the casting reel E to bring about the desired space-winding. Where the finger of the hand is used to guide the line upon a casting reel the windings are more or less irregular and often piled in upon each other at one position and therefore if drawn upon a drying reel from that position would take up the same pattern of winding and thus prevent proper cleaning of the line or its proper drying. In Figure 10 it is noted that the line 15 travels from the casting reel over and, if desired, around the wheel 20 on its way to the drying reel. It is found that when in the winding act the operating structure is slightly tilted in either direction so that the rod 19 tilts endwise in a vertical plane, the wheel while rotating will shift along the rod to a degree depending upon the amount of tilt imparted so that the desired space-winding results. Tilting may also be resorted to when rewinding the line upon the casting reel in that a more or less level winding, if desired, may result therefrom.

It is clear that the important space-winding is accomplished with either type of casting reel by the means provided.

I claim:

A fishing line drying reel including in its construction a supporting arm, a disc rotatably mounted on said arm, a reel arm fixed with respect to said disc, a plurality of reel arms each having an eye at one end encircling the named supporting arm, certain of the arms lying at opposite sides of the disc, there being recesses in the periphery of the latter substantially equally spaced from each other and each adapted to receive one of said arms of the plurality of arms thereinto, an abutment adjacent each recess to receive an arm against it, and a cam portion at each recess opposed to an abutment thereat, each said recess lying between an abutment and an adjacent cam portion, each cam portion adapted to guide an arm into a recess as said arm reaches the abutment.

LEWIS P. KELLY.

REFERENCES CITED

The following references are of record in the file of this patent:

UNITED STATES PATENTS

| Number | Name | Date |
| --- | --- | --- |
| 325,813 | Briggs | Sept. 8, 1885 |
| 967,734 | Darrow | Aug. 16, 1910 |
| 2,255,363 | Peterson | Sept. 9, 1941 |
| 2,282,147 | Quentin et al. | May 5, 1942 |
| 2,305,045 | Torrence | Dec. 15, 1942 |
| 2,461,979 | Hancock | Feb. 15, 1949 |

FOREIGN PATENTS

| Number | Country | Date |
| --- | --- | --- |
| 22,460 | Great Britain | Apr. 23, 1908 |
| 124,920 | Great Britain | Apr. 10, 1919 |